Dec. 10, 1963   W. C. CONOVER   3,113,625
MARINE PROPELLER AND ITS MOUNTING ON A PROPELLER SHAFT
Filed Dec. 13, 1961
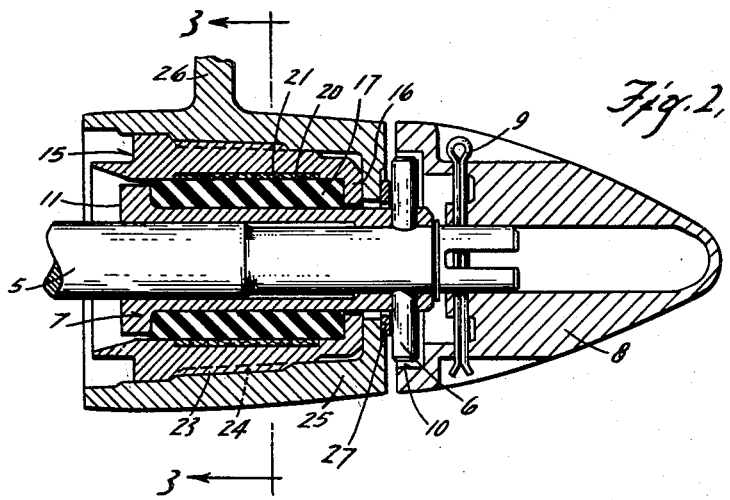
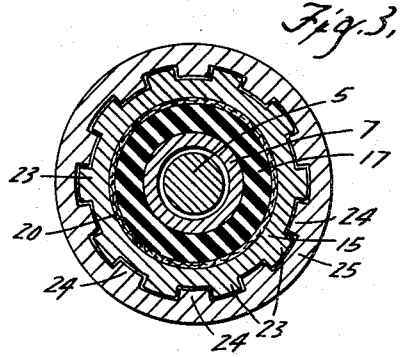
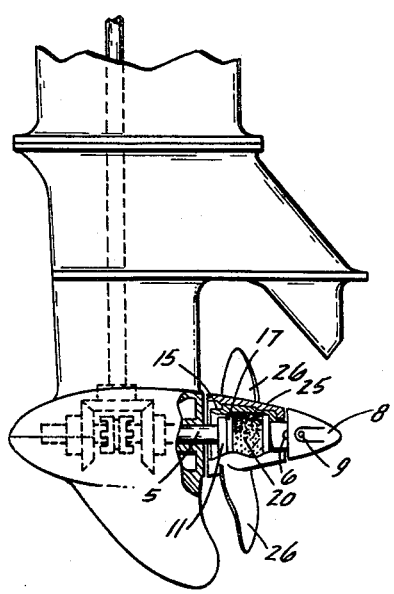
INVENTOR.
WARREN C. CONOVER
BY
Wheeler, Wheeler & Wheeler
ATTORNEYS.

United States Patent Office 3,113,625
Patented Dec. 10, 1963

3,113,625
MARINE PROPELLER AND ITS MOUNTING ON
A PROPELLER SHAFT
Warren C. Conover, Waukegan, Ill., assignor to Outboard
Marine Corporation, Waukegan, Ill., a corporation of
Delaware
Filed Dec. 13, 1961, Ser. No. 159,136
6 Claims. (Cl. 170—135.75)

This invention relates to a marine propeller and its mounting on a propeller shaft.

The disclosed preferred embodiment provides a propeller with inner, outer and intermediate hub elements. The inner hub element is a sleeve connected with the propeller shaft. The intermediate hub element is driven from this sleeve by a radially compressed elastomeric annulus which biases a friction ring against the intermediate hub. This annulus is desirably secured to the sleeve to assure that any slippage will occur at the intermediate hub element rather than between the rubber annulus and the inner sleeve. The friction ring has a substantially uniform coefficient of friction and is preferably made of material of the type used in brake lining. If made of such appropriate material and/or of proper surface configuration, the friction ring will rotate with the rubber annulus and slippage will occur only between the friction ring and the encircling hub element.

The inner and intermediate hub elements constitute a self-contained unitary assembly upon which the outer hub element is loosely splined. The complementary splined surfaces of the intermediate and outer hub elements have sufficient taper, and there is sufficient circumferential clearance between splines, so that the parts may readily be made by casting or forging or the like and assembled without machining and removed without special tools. The circumferential clearance between splines allows limited angular movement of the propeller outer hub element respecting the intermediate hub element every time the propeller is accelerated or decelerated, thus freeing the parts of any marine encrustations which might otherwise make it difficult for the average user to replace the propeller. A cap removably attached to the end of the shaft provides fairing and also retains the parts against loss in the event the pin is sheared.

There are many advantages of the structure described. In the first place, the friction ring slip clutch provides a substantially uniform coefficient of friction. In other words, the rubber is employed for resilient pressure and the transmission of driving torque and the slippage is controlled by the brake lining material. Generically, these advantages can be achieved without the provision of an intermediate hub element. On the other hand, the advantages of the intermediate hub element can be achieved without the friction ring, the slippage being between the rubber annulus and the intermediate hub element. In the disclosed embodiment, the rubber cushion which provides radial pressure on the brake lining material can also be used as a means of sealing the cavity in which the brake lining material operates, thus excluding water and retaining any special lubricants.

In addition, the arrangement is one in which the propeller may readily be replaced without special tools in the event of damage, or in the event that the user desires to substitute a propeller of different pitch. The cost of such replacement is greatly reduced by the fact that the slip clutch is not built into the parts requiring replacement.

In the drawings:

FIG. 1 is a fragmentary side elevation of a propulsion unit in which the invention may be used, portions of the unit being broken away to expose the material of the slip clutch drive.

FIG. 2 is an enlarged detail view in axial section through the hub elements of a propeller made in accordance with the invention, the propeller shaft being fragmentarily illustrated.

FIG. 3 is a detail view taken in section on the line 3—3 of FIG. 2.

A propeller shaft 5 is transversely bored to receive the shear pin 6 in a conventional manner. The shear pin passes through the inner hub element 7, whereby this hub element is driven from shaft 5 while the shear pin 6 remains intact. A cap 8 held to the end of propeller shaft 5, as by cotter pin 9, has a pocket 10 in which the shear pin 6 is housed. If the cap 8 is removed the shear pin is fully exposed for replacement.

The inner hub element 7 is fitted to the shaft and is in the nature of a sleeve having a flange 11 at its inner end. It is a driving rotor encircled by a second intermediate hub element 15, which has a flange 16 at its outer end spaced slightly from the inner hub element 7. At its inner end, the internal diameter of the intermediate hub element 15 is spaced slightly from the flange 11 of the inner hub element 7. Elsewhere the space between the two flanges 11 and 16 and between the inner hub element 7 and the intermediate hub element 15 is filled by an annular elastomeric cushion 17 which is fixed to the inner hub 7 and which is under compression and provides outward radial bias. In the preferred embodiment shown, the outward pressure of the rubber ring 17 is exerted upon a flexible friction drive ring 20 of brake lining or comparable material rather than directly on the intermediate hub element 15 or the outer propeller hub element 25. The elastomeric cushion ring not only provides radial bias but yields circumferentially under torque load due to vibration or to shock. This brake lining 20 is in a channel 21 counterbored in the inner periphery of the intermediate hub element 15. Since the elastomeric cushion 17 completely spans the channel 21 and is in pressure engagement with the inner periphery of the driven rotor, or hub element 15, beyond both ends of the brake lining, any desired lubrication to establish an appropriate or preferred environment for the operation of the brake lining will effectively be retained in the channel 21. At the same time, foreign abrasives such as sand will be effectively excluded.

The external periphery of the intermediate clutch element 15 is tapered rearwardly and provided with splines 23 with which the complementary splines 24 of the outer hub element 25 are loosely engaged. The parts can be made without machining and will not wedge or otherwise become seized in use due to the taper and the loose fit of the splines. The external hub element 25 carries the usual propeller blades 26.

If the propeller becomes damaged, the relative freedom of movement of the outer hub element 25 respecting the clutch-driven rotor 15 makes it very easily possible for an ordinary user to replace the damaged propeller without special tools. The cotter pin 9 is pulled and cap 8 withdrawn. The shear pin 6 may then be withdrawn. This releases the thrust washer 27, whereupon the external hub element 25 and propeller blades may simply be slipped off.

Conversely, if the problem involves repair of the slip clutch, the propeller proper is removed as above described and the slip clutch may then be disassembled and repaired or replaced independently of the propeller, the latter being restored to a position of use on the new or repaired clutch parts.

Therefore, a propeller embodying this invention has considerable advantage from the standpoint of reduced cost of manufacture, greater uniformity of slip clutch operation, and reduced cost of repair.

I claim:

1. A propeller and hub structure comprising a drive shaft, a propeller blade assembly upon an outer hub element, a second hub element in freely separable splined connection with the outer hub element, said splined connection having rotary play in normal operation and a mounting for the second hub element including shock absorbing driving means between said drive shaft and said second hub element.

2. A structure according to claim 1 in which the shock absorbing driving means comprises an inner hub element and an elastomeric cushion under radial compression mounted on the inner hub element and confined under pressure within the second hub element.

3. A structure according to claim 2 in further combination with a ring of friction driving material interposed between the cushion and the second hub element, the radial compression of the elastomeric cushion resiliently biasing said ring radially outwardly into frictional driving contact with the second hub element.

4. A propeller shaft and propeller assembly comprising the combination with a shaft provided with a shear pin, of a terminal cap enclosing the shear pin, an inner hub sleeve element engaging the shear pin and connected thereby with the shaft and which is provided with a flange, an intermediate hub element encircling said inner sleeve element and having a flange spaced from the flange first mentioned, an elastomeric cushion confined under pressure between said flanges and between the inner hub sleeve element and the second mentioned hub element, the second mentioned hub element having an undercut channel in its inner periphery encircling the elastomeric cushion, a ring of friction material in the channel subject to the bias of the cushion radially outwardly against the second mentioned hub element, and an outer hub element having propeller blades and detachably mounted on the second mentioned hub element in driven connection therewith, the outer hub element having a terminal flange confined between the cap and the flange of the second mentioned hub element.

5. An assembly according to claim 4 in which the intermediate hub element and outer hub element are tapered and splined and loosely engaged with sufficient clearance to accommodate limited relative movement and to facilitate separation and assembly.

6. A slip clutch organization comprising in combination a first rotor having a peripheral cylindrical surface, a compressed elastomeric ring extending about the surface, a second rotor having a cylindrical surface opposed to the said surface of the first rotor and radially confining the ring, said ring being between the said surfaces of the respective rotors, means for axially confining the ring under pressure, and a friction driving annulus of substantially constant friction coefficient between the elastomeric ring and one of said surfaces and subject to the radial pressure exerted by said ring to maintain the annulus in pressure engagement with the rotor having the last mentioned surface, said last mentioned rotor having an internal channel in which said annulus is disposed, the channel being spanned by the elastomeric ring.

References Cited in the file of this patent

UNITED STATES PATENTS

| | | |
|---|---|---|
| 2,111,245 | Irgens | Mar. 15, 1938 |
| 2,539,630 | Krueger et al. | Jan. 30, 1951 |
| 2,543,396 | Wolff | Feb. 27, 1951 |
| 2,564,605 | Martin | Aug. 14, 1951 |
| 2,569,144 | Benson | Sept. 25, 1951 |
| 2,642,730 | Snyder | June 23, 1953 |
| 2,751,987 | Kiekhaefer | June 26, 1956 |
| 2,974,502 | Radcliffe | Mar. 14, 1961 |
| 2,993,544 | Carlson | July 25, 1961 |
| 3,002,365 | Liljequist | Oct. 3, 1961 |